(12) United States Patent
Kanterakis et al.

(10) Patent No.: US 6,169,759 B1
(45) Date of Patent: Jan. 2, 2001

(54) COMMON PACKET CHANNEL

(75) Inventors: Emmanuel Kanterakis, North Brunswick, NJ (US); Kourosh Parsa, Riverside, CT (US)

(73) Assignee: Golden Bridge Technology, West Long Branch, NJ (US)

( * ) Notice: Under 35 U.S.C. 154(b), the term of this patent shall be extended for 0 days.

(21) Appl. No.: 09/273,508

(22) Filed: Mar. 22, 1999

(51) Int. Cl.[7] .................................................. H04K 1/00
(52) U.S. Cl. ........................ 375/130; 375/141; 370/342; 370/347
(58) Field of Search .................. 375/130, 140, 375/141; 370/208, 209, 342, 337, 335, 347, 503, 506, 512, 514, 365, 366

(56) References Cited

U.S. PATENT DOCUMENTS

| | | | |
|---|---|---|---|
| 5,103,459 | 4/1992 | Gilhousen et al. | 370/208 |
| 5,280,472 | 1/1994 | Gilhousen et al. | 370/208 |
| 5,384,777 | 1/1995 | Ahmadi et al. | 370/503 |
| 5,461,639 | 10/1995 | Wheatley, III et al. | 370/342 |
| 5,537,397 | 7/1996 | Abramson | 375/130 |
| 5,544,196 | 8/1996 | Tiedemann, Jr. et al. | 375/150 |
| 5,673,259 | 9/1997 | Quick, Jr. | 370/342 |
| 5,802,465 | 9/1998 | Hamalainen et al. | 455/403 |
| 5,825,835 | 10/1998 | Kingston et al. | 375/367 |
| 5,850,602 | 12/1998 | Tisdale et al. | 455/430 |
| 5,875,182 | 2/1999 | Hatzipapafotiou | 370/321 |
| 5,893,036 | 4/1999 | Trandai et al. | 455/522 |
| 5,894,472 | 4/1999 | de Seze | 370/337 |
| 5,933,777 | 8/1999 | Rahman | 455/450 |
| 5,943,327 | 8/1999 | Mademann | 370/329 |
| 5,953,369 | 9/1999 | Suzuki | 375/346 |
| 5,982,763 | 11/1999 | Sato | 370/342 |
| 5,991,308 | 11/1999 | Fuhrmann et al. | 370/474 |
| 6,009,089 | 12/1999 | Huang et al. | 370/342 |
| 6,011,788 | 4/2000 | Hurst et al. | 370/335 |
| 6,026,081 | 2/2000 | Hamabe | 370/335 |
| 6,031,832 | 2/2000 | Turina | 370/348 |
| 6,038,223 | 3/2000 | Hansson et al. | 370/329 |
| 6,038,250 | 3/2000 | Shou et al. | 370/335 |

Primary Examiner—Tesfaldet Bocure
(74) Attorney, Agent, or Firm—McDermott, Will & Emery

(57) ABSTRACT

An improvement to a code-division-multiple-access (CDMA) system employing spread-spectrum modulation, with the CDMA system having a base station (BS) and a plurality of remote stations. The base station has a BS-spread-spectrum transmitter and a BS-spread-spectrum receiver. A remote station has an RS-spread-spectrum transmitter and an RS-spread-spectrum receiver. The BS transmitter transmits a broadcast common-synchronization channel, which includes a frame-timing signal. The broadcast common-synchronization channel has a common chip-sequence signal, which is common to the plurality of remote stations. In response to the RS-spread-spectrum receiver receiving the broadcast common-synchronization channel, and determining frame timing from the frame-timing signal, an RS-spread-spectrum transmitter transmits an access-burst signal. The BS-spread-spectrum transmitter, responsive to the BS-spread-spectrum receiver receiving the access-burst signal, transmits an acknowledgment signal. In response to the first RS-spread-spectrum receiver receiving the acknowledgment signal, the first RS-spread-spectrum transmitter transmits a spread-spectrum signal having data.

58 Claims, 11 Drawing Sheets

(A) boxes: $g_{k,0}A$ | $g_{k,1}A$ | $g_{k,2}A$ | - - - | $g_{k,N-1}A$ (B) boxes: $g_{k,0}A_{k,i0}$ | $g_{k,1}A_{k,i1}$ | $g_{k,2}A_{k,i2}$ | - - - | $g_{k,N-1}A_{k,i(N-1)}$ $$A_{k,ij} \in [A_0, A_1, A_2, \ldots, A_{N-1}]$$
$$A_{k1,ij} \neq A_{k2,ij}$$

FIG. 8

COMMON PACKET CHANNEL

BACKGROUND OF THE INVENTION

This invention relates spread-spectrum communications, and more particularly to code-division-multiple-access (CDMA) cellular, packet-switched systems.

Description of the Relevant Art

Presently proposed for a standard is a random-access burst structure which has a preamble followed by a data portion. The preamble has 16 symbols, the preamble sequence, spread by an orthogonal Gold code. A mobile station acquires chip and frame synchronization.

SUMMARY OF THE INVENTION

A general object of the invention is an efficient method for packet data transfer on CDMA systems.

Another object of the invention is high data throughput and low delay.

According to the present invention, as embodied and broadly described herein, an improvement to a code-division-multiple-access (CDMA) system employing spread-spectrum modulation, is provided. The CDMA system has a base station (BS) and a plurality of remote stations. The base station has BS-spread-spectrum transmitter and a BS-spread-spectrum receiver. Each of the plurality of remote stations has an RS-spread-spectrum transmitter and an RS-spread-spectrum receiver. The method comprises the steps of transmitting from BS-spread-spectrum transmitter, a broadcast common-synchronization channel. The broadcast common-synchronization channel has a common chip-sequence signal common to the plurality of remote stations.

Further, the broadcast common-synchronization channel has a frame-timing signal.

A first RS-spread-spectrum receiver, located at a first remote station, the method includes the step of receiving the broadcast common-synchronization channel. From the received broadcast common-synchronization channel, the steps include determining frame timing at the first RS-spread-spectrum receiver from the frame-timing signal.

At a first RS-spread-spectrum transmitter, located at the first remote station, the steps include transmitting an access-burst signal. The access-burst signal has a plurality of segments. A segment is an interval in time of the access-burst signal. Each segment has a preamble followed by a pilot signal.

The plurality of segments preferably also has a plurality of power levels, respectively. Preferably, the plurality of power levels increase sequentially, with each segment.

At the BS spread-spectrum receiver the steps include receiving the access-burst signal at a detected-power level. In response to receiving the access-burst signal, from the BS-spread-spectrum transmitter, the steps include transmitting to the first RS-spread-spectrum receiver an acknowledgment signal.

At the first RS-spread-spectrum receiver the steps include receiving the acknowledgment signal. In response to receiving the acknowledgment signal, the steps include transmitting from the first RS-spread-spectrum transmitter, to said BS-spread-spectrum receiver, a spread-spectrum signal having data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 8 shows the structure of the preamble;

DETAILED DESCRIPTION OF THE PREFERRED EMBODIMENTS

Figure 1:
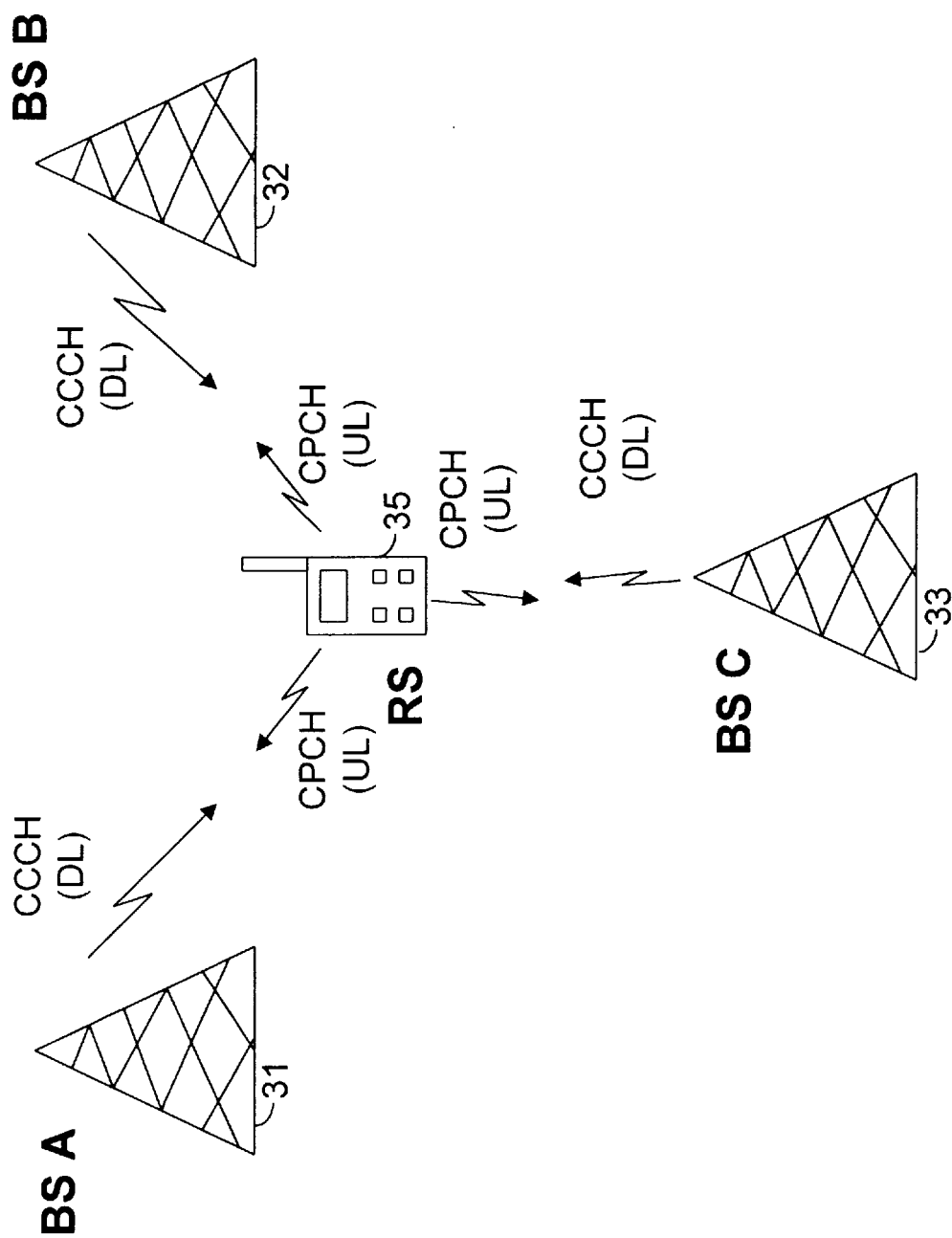
FIG. 1 is a common packet channel system block diagram with a common control downlink channel.

Reference now is made in detail to the present preferred embodiments of the invention, examples of which are illustrated in the accompanying drawings, wherein like reference numerals indicate like elements throughout the several views.

The common-packet channel is a new and novel uplink transport channel for transmitting variable size packets from a mobile station to a base sation within listening range, without the need to obtain a two way link with any one or set of base stations. The channel resource allocation is contention based; that is, a number of mobile stations could at any time content for the same resources, as found in an ALOHA system.

In the exemplary arrangement shown in FIG. 1, common-packet channel provides an improvement to a code-division-multiple-access (CDMA) system employing spread-spectrum modulation. The CDMA system has a plurality of base stations (BS) 31, 32, 33 and a plurality of remote stations (RS). Each remote station 35 has an RS-spread-spectrum transmitter and an RS-spread-spectrum receiver. An uplink is from the remote station 35 to a base station 31. The uplink has the common-packet channel (CPCH). A downlink is from a base station 31 to the remote station 35, and is denoted a common-control channel (CCCH). The common-control channel has common signaling used by the plurality of remote stations.

Figure 2:
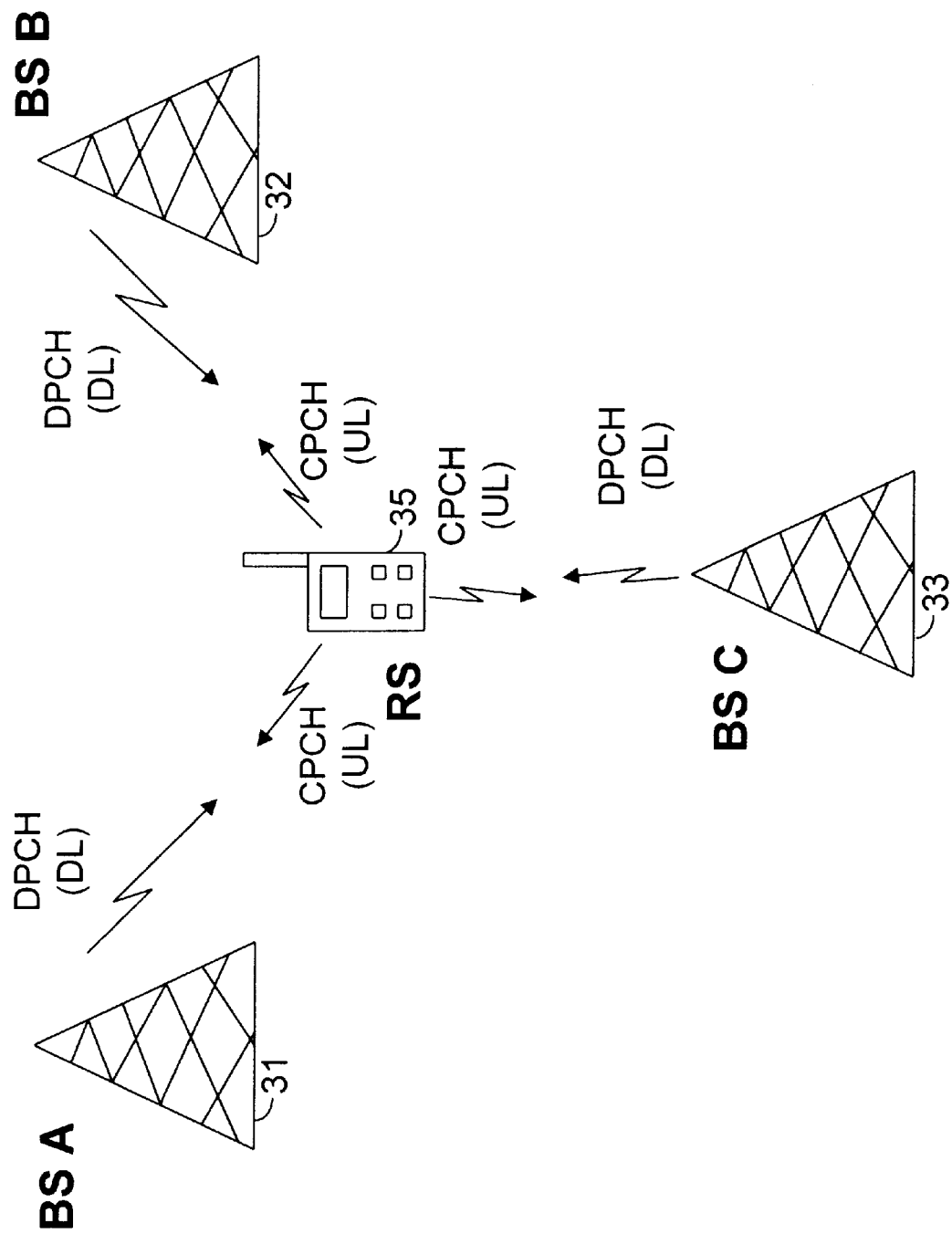
FIG. 2 is common packet channel system block diagram with a dedicated downlink channel.

An alternative to the common-control channel, but still using the common-packet channel, is the downlink dedicated physical channel (DPCH), shown in FIG. 2. The dedicated downlink channel, has signaling that is used for controlling a single remote station.

Figure 3:
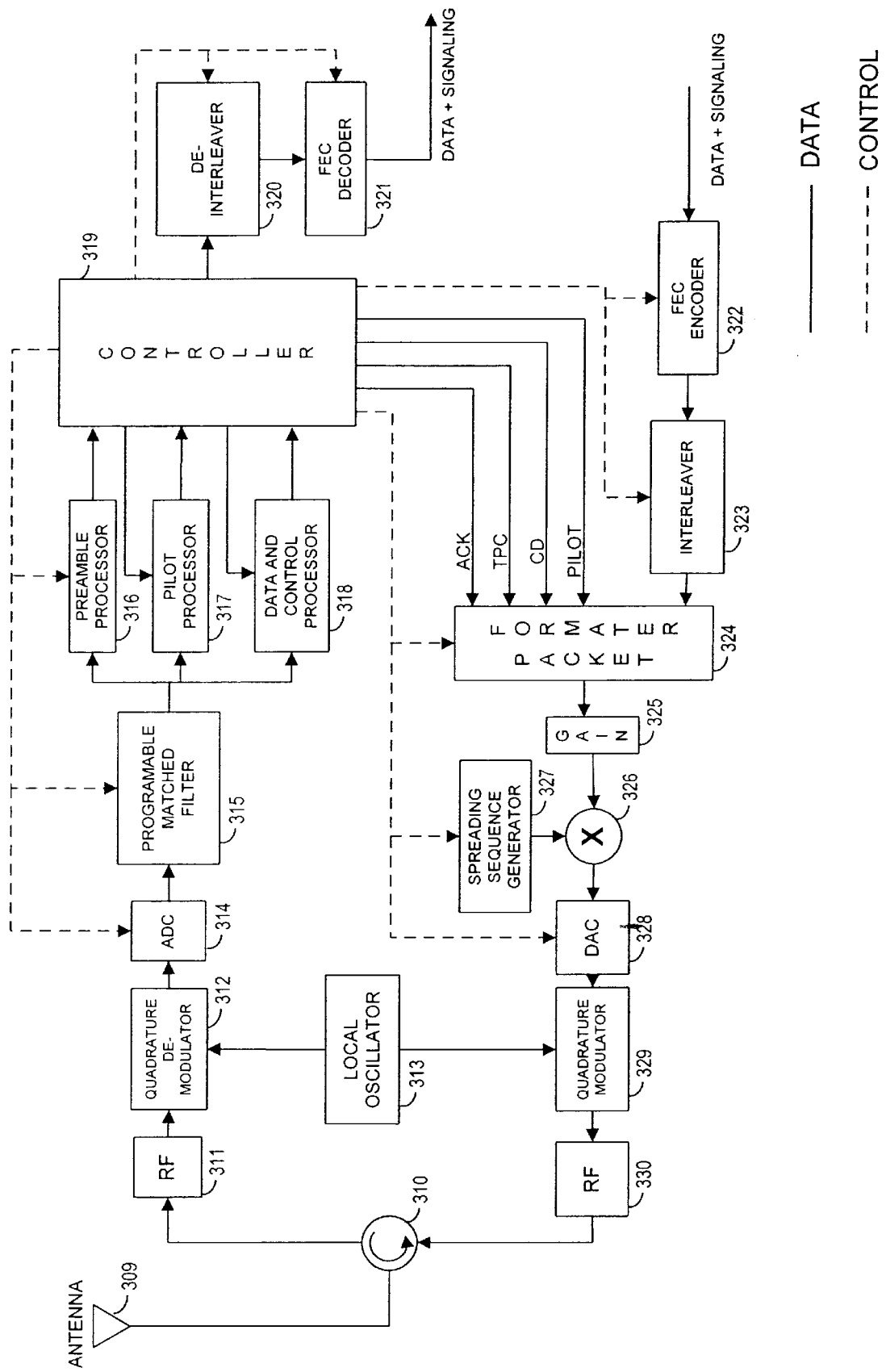
FIG. 3 is a block diagram of a base station receiver and transmitter for common packet channel.

As illustratively shown in FIG. 3, a BS spread-spectrum transmitter and a BS spread-spectrum receiver is shown. The BS spread-spectrum transmitter and the BS spread-spectrum receiver are located at the base station 31. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 314 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321.

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 326 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, programmable-matched filter 315, preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by receiver RF section 311. The local oscillator 313 generates a local signal which quadrature demodulator 312 uses to demodulator in-phase and quadrature phase components of the received spread-spectrum signal. The analog-to-digital converter 314 converts the in-phase component and the quadrature-phase component to a digital signal. These functions are well known in the art, and variations to this block diagram can accomplish the same function.

The programmable-matched filter 315 despreads the received spread-spectrum signal. A correlator, as an alternative, may be used as an equivalent means for despeading the received spread-spectrum signal.

The preamble processor 316 detects the preamble portion of the received spread-spectrum signal. The pilot processor detects and synchronizes to the pilot portion of the received spread-spectrum signal. The data and control processor detects and processes the data portion of the received spread-spectrum signal. Detected data passes through the controller 319 to the de-interleaver 320 and FEC decoder 321. Data and signaling are outputted from the FEC decoder 321.

In the BS transmitter, data are FEC encoded by FEC encoder 322, and interleaved by interleaver 323. The packet formatter formats data, signaling, acknowledgment signal, collision detection signal, pilot signal and transmitting power control (TPC) signal into a packet. The packet is outputted from packet formatter, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The packet is translated to a carrier frequency, filtered and amplified by transmitter RF section 330, and then passes through circulator 310 and is radiated by antenna 309.

Figure 4:
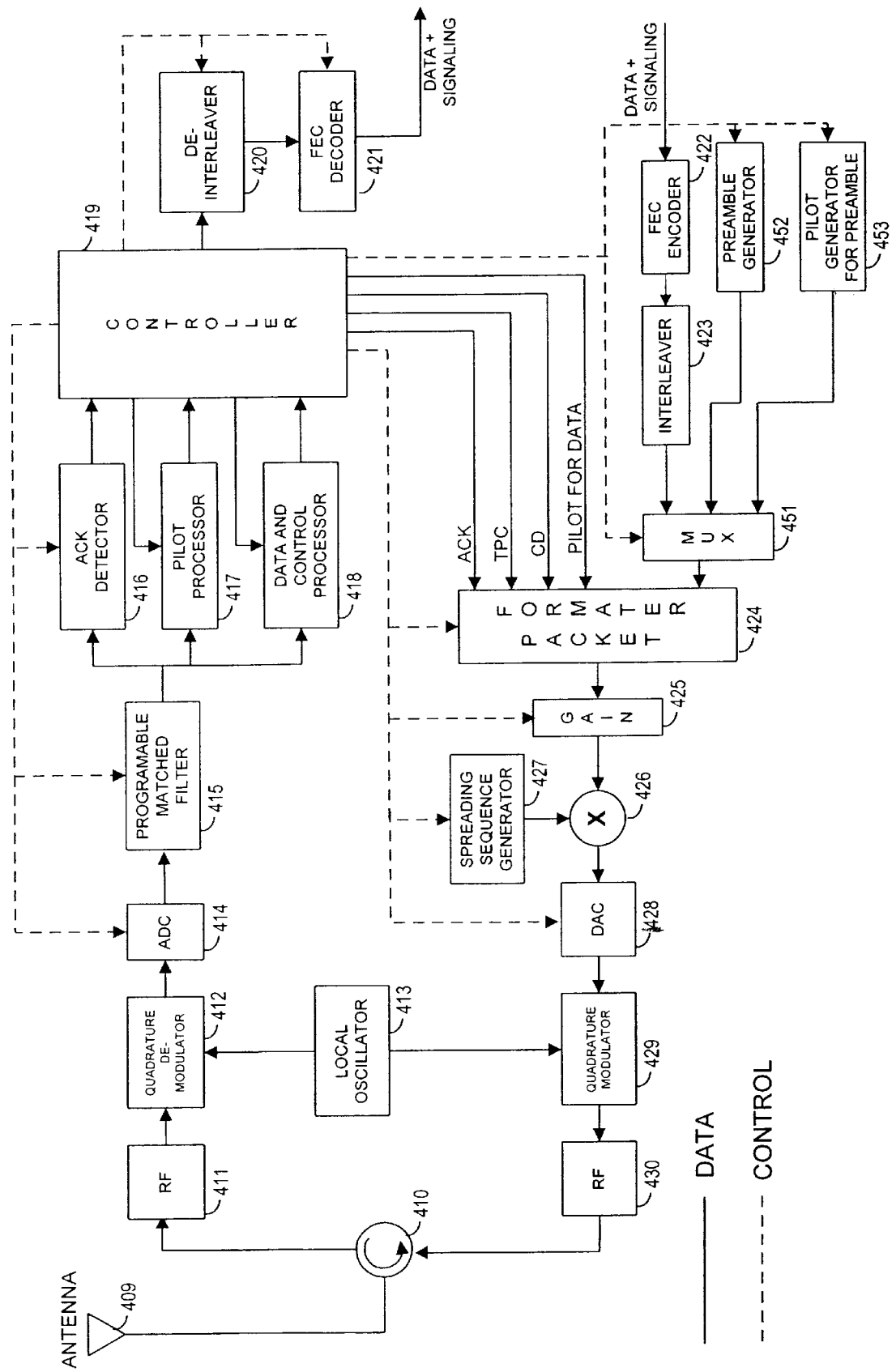
FIG. 4 is a block diagram of a remote station receiver and transmitter for common packet channel.

In the illustrative embodiment shown in FIG. 4, a RS spread-spectrum transmitter and a RS spread-spectrum receiver are shown. The RS spread-spectrum transmitter and the RS spread-spectrum receiver are located at the remote station 35, shown in FIG. 1. The RS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421.

The RS spread-spectrum transmitter includes a forward-error-correction (FEC) encoder 422 coupled to an interleaver 423. A packet formatter 424 is coupled through a multiplexer 451 to the interleaver 423 and to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, programmable-matched filter 415, acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by receiver RF section 411. The local oscillator 413 generates a local signal which quadrature demodulator 412 uses to demodulate inphase and quadrature phase components of the received spread-spectrum signal. The analog-to-digital converter 414 converts the in-phase component and the quadrature-phase component to a digital signal. These functions are well known in the art, and variations to this block diagram can accomplish the same function.

The programmable-matched filter 415 despreads the received spread-spectrum signal. A correlator, as an alternative, may be used as an equivalent means for despreading the received spread-spectrum signal.

The acknowledgment detector 416 detects the acknowledgment in the received spread-spectrum signal. The pilot processor detects and synchronizes to the pilot portion of the received spread-spectrum signal. The data and control processor detects and processes the data portion of the received spread-spectrum signal. Detected data passes through the controller 419 to the de-interleaver 420 and FEC decoder 421. Data and signaling are outputted from the FEC decoder 421.

In the MS transmitter, data are FEC encoded by FEC encoder 422, and interleaved by interleaver 423. The preamble generator 452 generates a preamble and the pilot generator 453 generates a pilot for the preamble. The multiplexer 451 multiplexes the data, preamble and pilot, and the packet formatter 424 formats the preamble, pilot and data into a common-packet channel packet. Further, the packet formatter formats data, signaling, acknowledgment signal, collision detection signal, pilot signal and TPC signal into a packet. The packet is outputted from packet formatter, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and in-phase and quadrature-phase components are generated by quadrature modulator 429 using a signal from local oscillator 413.

Figure 5:
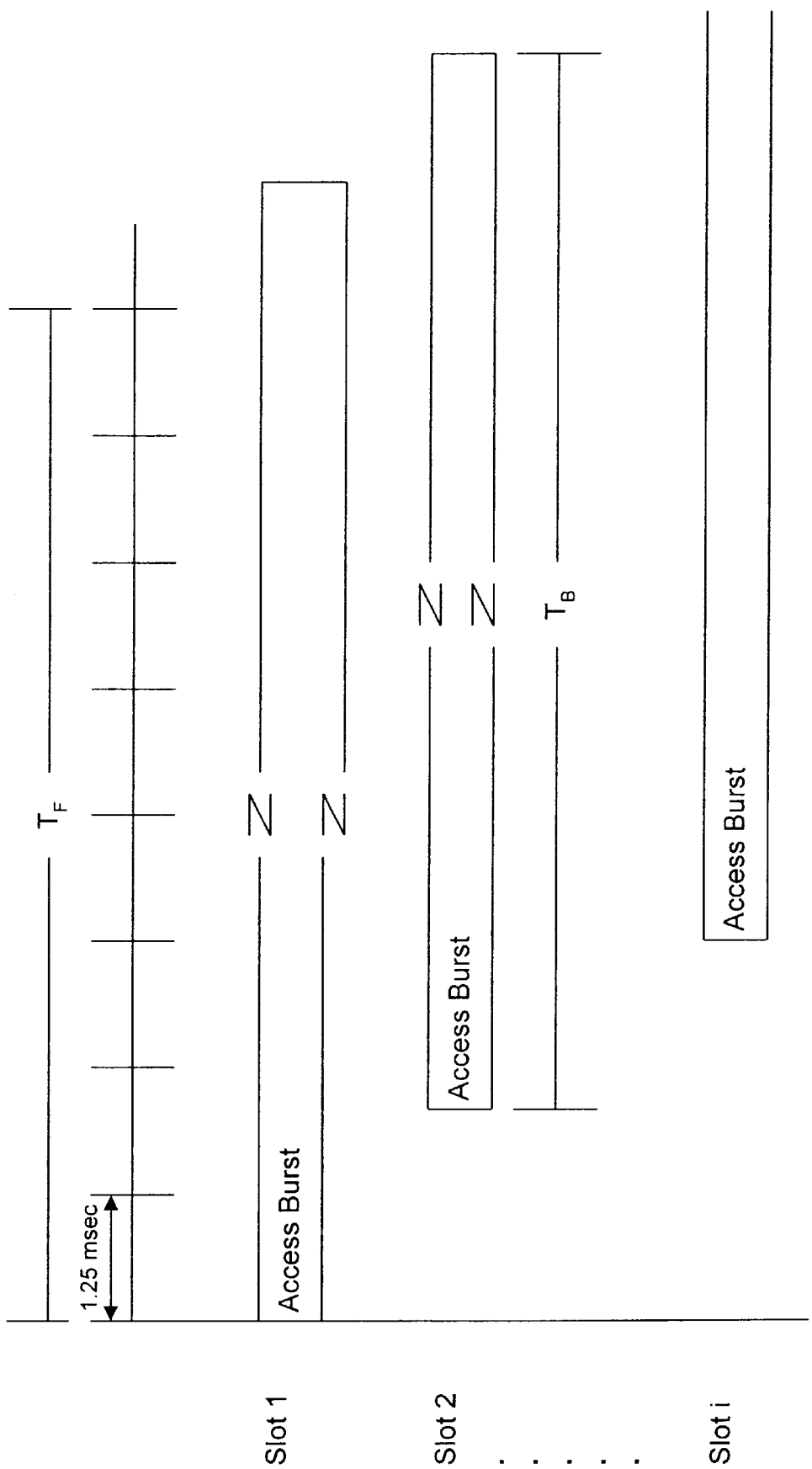
FIG. 5 is a timing diagram for access burst transmission.

Referring to FIG. 5, the base station transmits a common-synchronization channel, which has a frame time duration $T_F$. The common-synchronization channel has a common chip-sequence signal, which is common to the plurality of remote stations communicating with the particular base station. In a particular embodiment, the time $T_F$ of one frame is ten milliseconds. Within one frame, there are eight access slots. Each access slot lasts 1.25 milliseconds. Timing for the access slots is the frame timing, and the portion of the common-synchronization channel with the frame timing is denoted the frame-timing signal. The frame-timing signal is the timing a remote station uses in selecting an access slot in which to transmit an access-burst signal.

A first remote station attempting to access the base station, has a first RS-spread-spectrum receiver for receiving the common synchronization channel, broadcast from the base station. The first RS-spread-spectrum receiver determines frame timing from the frame-timing signal.

A first RS-spread-spectrum transmitter, located at the first remote station, transmits an access-burst signal. An access burst signal, as shown in FIG. 5, starts at the beginning of an access slot, as defined by the frame timing portion of the common-synchronization channel.

Figure 6:
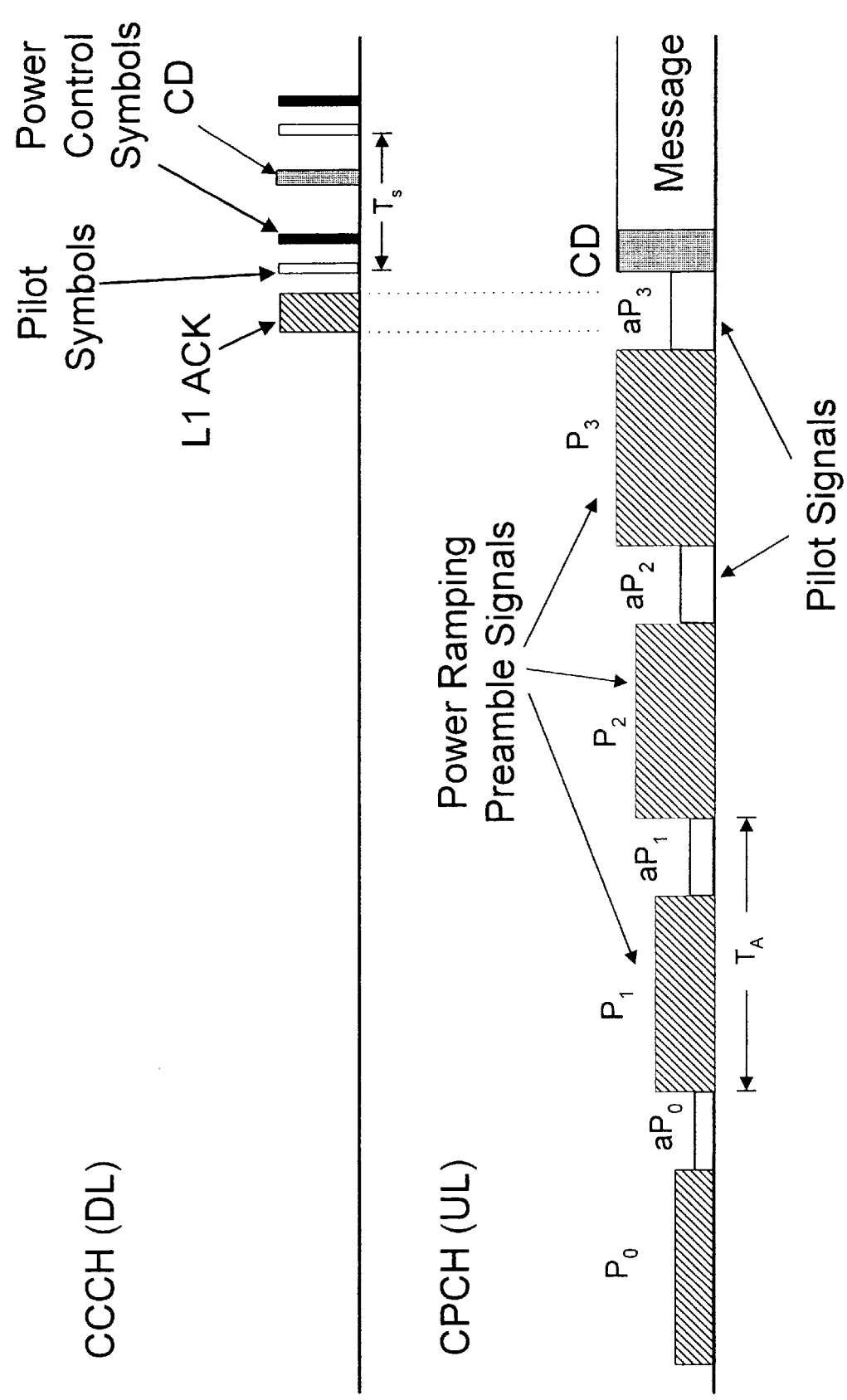
FIG. 6 illustrates common packet channel access burst of FIG. 5 using a common control downlink channel.
Figure 7:
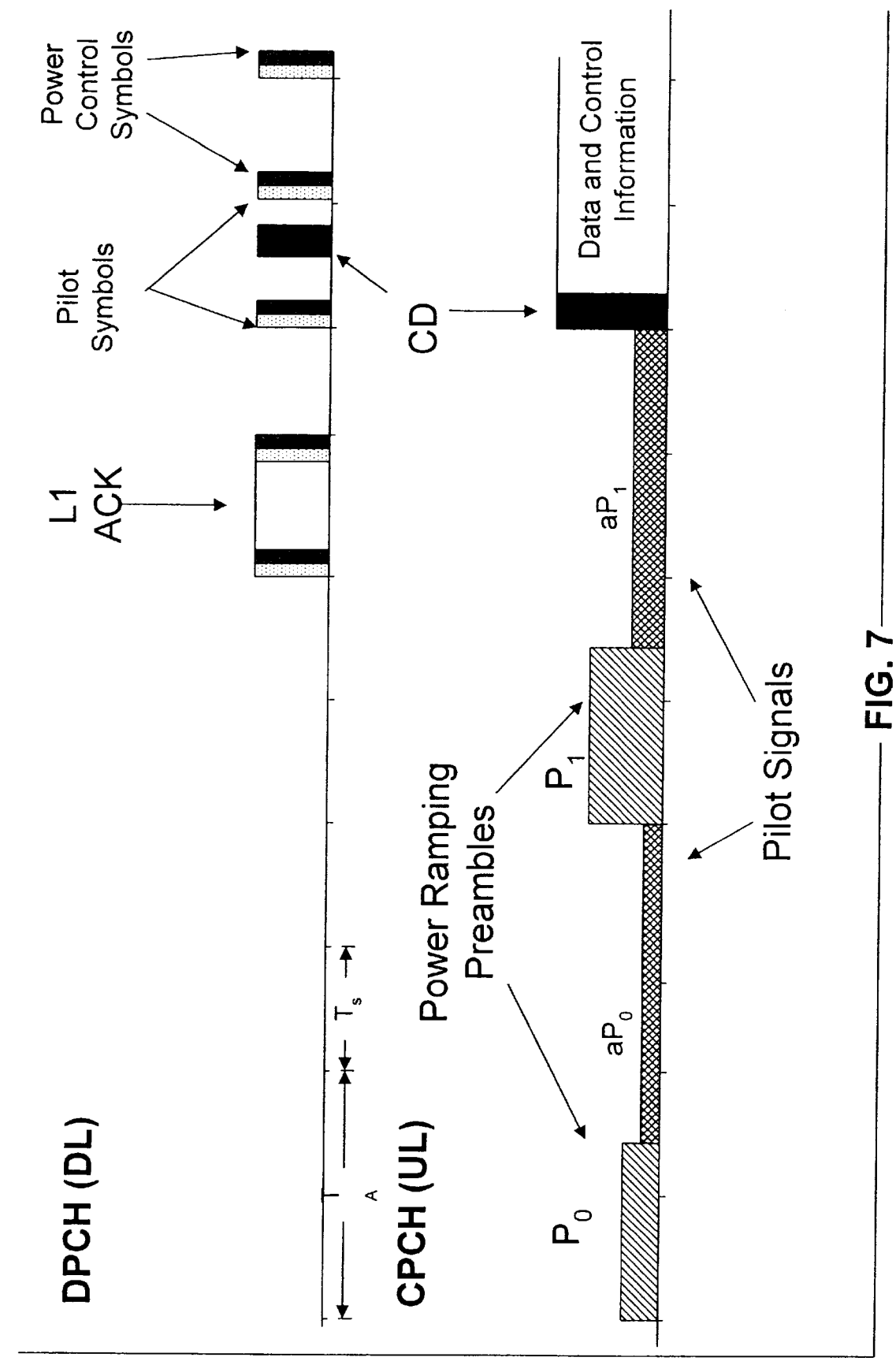
FIG. 7 illustrates common packet channel access of FIG. 5 using a dedicated downlink channel

FIG. 6 illustratively shows the common-packet channel access burst format, for each access-burst signal. Each access-burst signal has a plurality of segments. Each segment has a preamble followed by a pilot signal. The plurality of segments has a plurality of power levels, respectively. More particularly, the power level of each segment increases with each subsequent segment. Thus, a first segment has a first preamble and pilot, at a first power level $P_0$. A second segment has a second preamble and a second pilot, at a second power level $P_1$. The third segment has a third preamble and a third pilot at a third power level $P_2$. The first preamble, the second preamble, the third preamble, and subsequent preambles, may be identical or different. The power level of the pilot preferably is less than the power level of the preamble. A preamble is for synchronization, and a corresponding pilot, which follows a preamble, is to keep the BS spread-spectrum receiver receiving the spread-spectrum signal from the remote station, once a preamble is detected.

A subsequent increase or decrease of power levels is basically a closed loop power control system. Once a BS spread-spectrum receiver detects a preamble from the remote station, the BS spread-spectrum transmitter sends an acknowledgment (ACK) signal.

Figure 9:
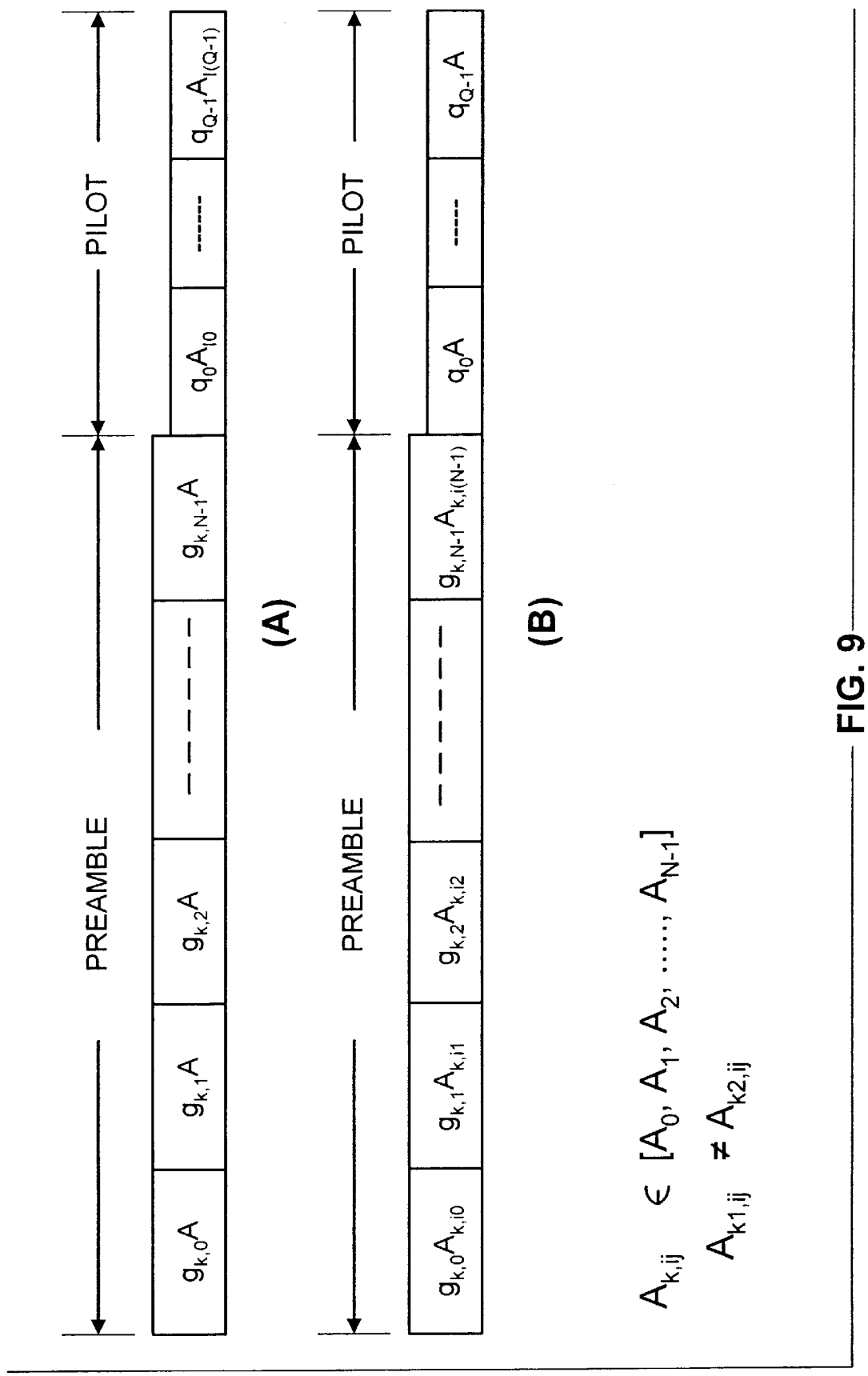
FIG. 9 illustrates preamble and pilot formats.

Referring to FIG. 4, the preamble is generated by preamble generator 452 and the pilot is generated by pilot generator 453. A preamble format is shown in FIG. 8. The preamble format with a pilot is shown in FIG. 9. The multiplexer 451, with timing from the controller 419, selects the preamble then a corresponding pilot, for packet formatter 424. A series of preambles and pilots may be generated and made as part of the packet by packet formatter 424. The preambles and pilots can have their power level adjusted either in the preamble generator 452 and pilot generator 453, or by the variable gain device 425.

The BS spread-spectrum receiver receives the access-burst signal at a detected-power level. More particularly, the access-burst signal has the plurality of preambles at a plurality of power levels, respectively. When a preamble with sufficient power level is detected at the BS spread-spectrum receiver, then an acknowledgment (ACK) signal is transmitted from the BS spread-spectrum transmitter. The ACK signal is shown in FIG. 6, in response to the fourth preamble having sufficient power for detection by the BS spread-spectrum receiver.

FIG. 3 shows the preamble processor 316 for detecting the preamble and the pilot processor 317 for continuing to receive the packet after detecting the preamble. Upon detecting the preamble, the processor 319 initiates an ACK signal which passes to packet formatter 324 and is radiated by the BS spread-spectrum transmitter.

The first RS-spread-spectrum receiver receives the acknowledgment signal. Upon receiving the ACK signal, the first RS-spread-spectrum transmitter transmits to the BS-spread-spectrum receiver, a spread-spectrum signal having data. The data is shown in FIG. 6, in time, after the ACK signal. The data includes a collision detection (CD) portion of the signal, referred to herein as a collision detection signal, and message.

Figure 10:
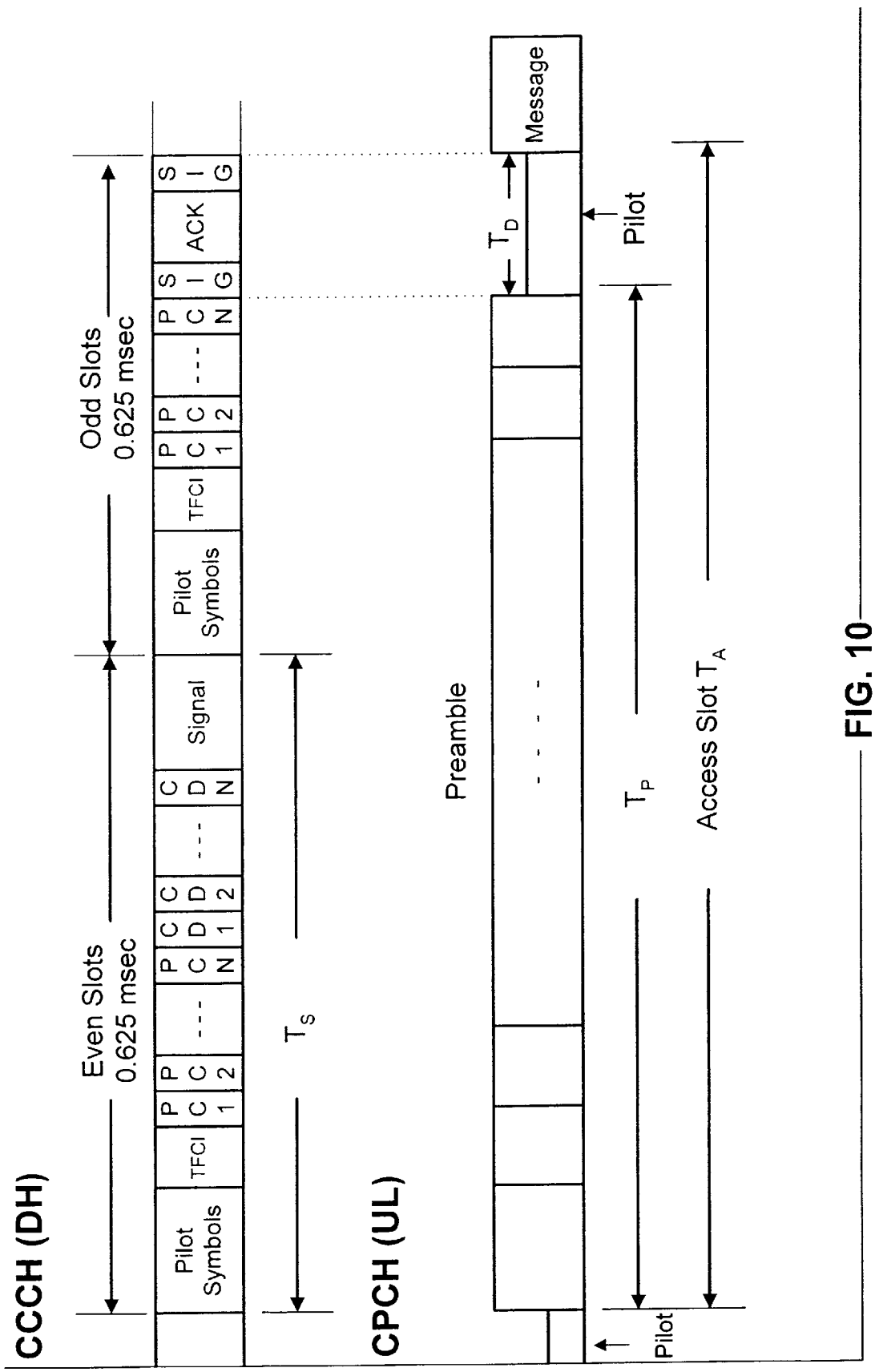
FIG. 10 is a common packet channel timing diagram and frame format of the down link common control link.

In response to each packet transmitted from the RS spread-spectrum transmitter, the BS receiver detects the collision detection portion of the data, and retransmits the data field of the collision detection portion of the data to the remote station. FIG. 10 shows the timing diagram for re-transmitting the collision detection field. There are several slots for collision detection retransmission, which can be used for re-transmitting the collision detection field for several remote stations. If the collision detection field were correctly re-transmitted to the remote station, then the remote station knows its packet is successfully received by the base station. If the collision detection field were not correctly re-transmitted by the base station, then the remote station assumes there is a collision with a packet transmitted by another remote station, and stops further transmission of the data.

Figure 11:
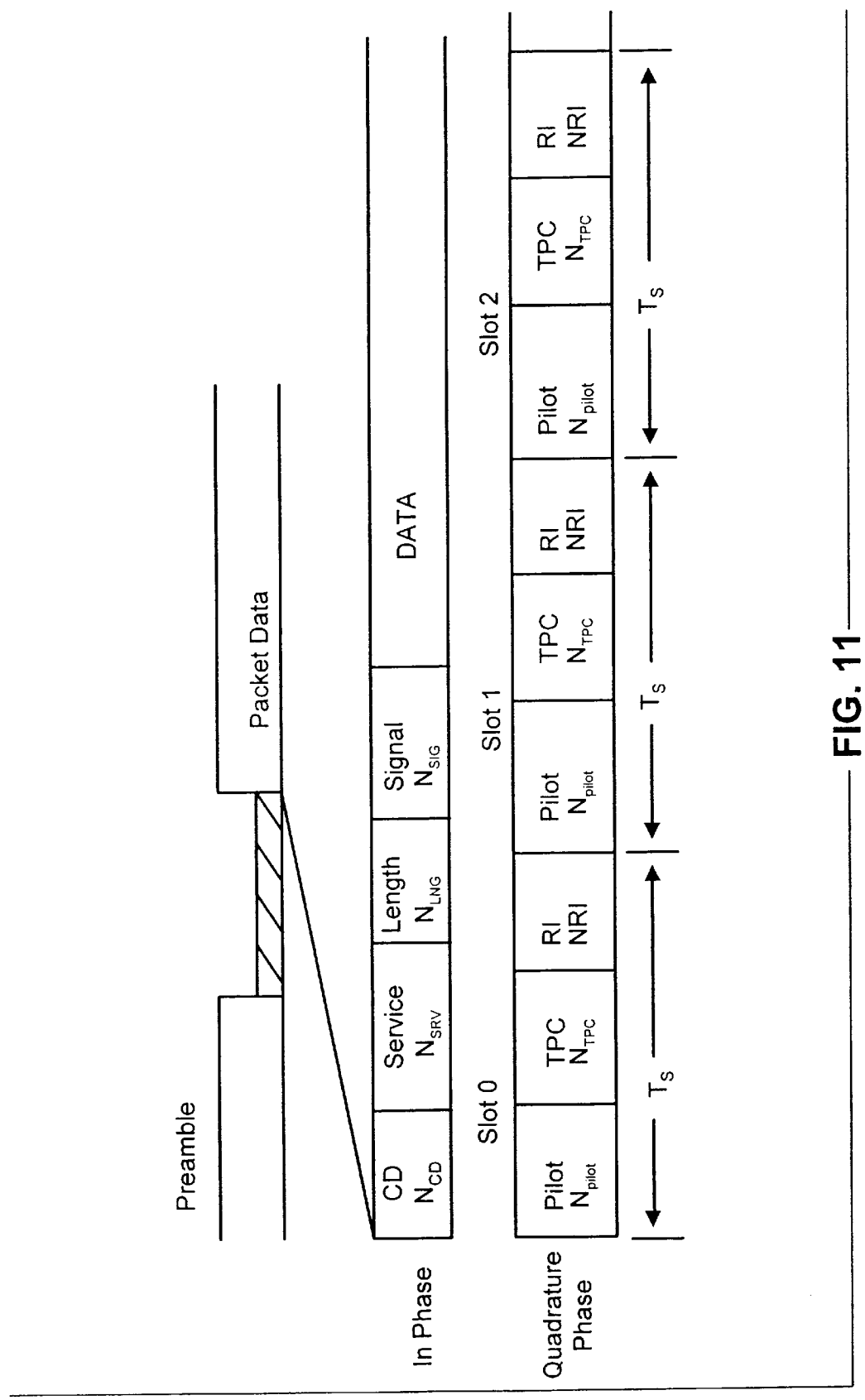
FIG. 11 illustrates frame format of common packet channel, packet data.

FIG. 11 shows a frame format of a common-packet channel data payload.

In operation, an overview of the way this transport mechanism is used is as follows. A remote station (RS) upon power up searches for transmission from nearby base stations. Upon successful synchronization with one or more base stations, the Remote station receives the necessary system parameters from a continuously transmitted by all base stations broadcast control channel (BCCH). Using the information transmitted from the BCCH, the remote station can determine various parameters required when first transmitting to a base station. Parameters of interest are the loading of all the base station in the vicinity of the remote station, their antenna characteristics, spreading codes used to spread the downlink transmitted information, timing information and other control information. With this information, the remote station can transmit specific waveforms in order to capture the attention of a nearby base station. In the common packet channel the remote station, having all the necessary information from the nearby base station, it starts transmitting a particular preamble from a set of predefined preambles, at a well selected time intervals. The particular structure of the preamble waveforms is selected on the basis that detection of the preamble waveform at the base station is to be as easy as possible with minimal loss in detectability.

The physical common packet channel (CPCH) is used to carry the CPCH. It is based on the well known Slotted ALOHA approach. There is a number of well defined time offsets relative to the frame boundary of a downlink received BCCH channel. These time offsets define access slots. The number of access slots is chosen according to the particular application at hand. As an example, shown in FIG. 5, eight access slots are spaced 1.25 msec apart in a frame of 10-msec duration.

According to FIG. 5, a remote station picks an access slot in a random fashion and tries to obtain a connection with a base station by transmitting a preamble waveform. The base station is able to recognize this preamble, and is expecting its reception at the beginning of each access slot. The length of the access burst is variable and the length of the access burst is allowed to vary from a few access slots to many frame durations. The amount of data transmitted by the remote station could depend on various factors. Some of those are: class capability of the remote station, prioritization, the control information transmitted down by the base station, and various bandwidth management protocols residing and executed at the base station.

A field at the beginning of the data portion signifies the length of the data.

The structure of the access burst is shown in FIG. 6. The access burst starts with a set of preambles of duration $T_P$ whose power is increased in time from preamble to preamble in a step-wise manner. The transmitted power during each preamble is constant. For the duration $T_D$ between preambles the access burst consists of a pilot signal transmitted at a fixed power level ratio relative to the previously transmitted preamble. There is a one to one correspondence between the code structure of the preamble and the pilot signal. The pilot signal could be eliminated by setting it to a zero power level.

The transmission of the preambles ceases because either the preamble has been picked up, detected, by the base station, and the base station has responded to the remote station with a layer one acknowledgment L1 ACK which the remote station has also successfully received. Transmission of the preamble seizes also if the remote station has transmitted the maximum allowed number of preambles $M_P$. Upon receiving this L1 ACK the remote station starts transmission of its data. Once the remote station has transmitted more than $M_P$ preambles, it undergoes a forced random back off procedure. This procedure forces the remote station to delay its access burst transmission for a later time. The random back off procedure could be parameterized based on the priority statues of the Remote station. The amount by which the power is increased from preamble to preamble is $D_P$ which is either fixed for all cells at all times or it is repeatedly broadcast via the BCCH. Remote stations with different priority status could use a power increase which depends on a priority status assigned to the remote station. The priority status could be either predetermined or assigned to the remote station after negotiation with the base station.

The Preamble Signal Structure

There is a large set of possible preamble waveforms. Every base station is assigned a subset of preambles from the set of all preamble waveforms in the system. The set of preambles a base station is using is broadcast through its BCCH channel. There are many ways of generating preamble waveforms. One existing way is to use a single orthogonal Gold code per preamble from the set of all possible orthogonal Gold codes of length L. A preamble could then be constructed by repeating the Gold code a number of times N to transmit a length N complex sequence. For example if A denotes the orthogonal Gold code and $G_i = \{g_{i,0}, g_{i,1}, g_{i,2}, \ldots g_{i,N-1}\}$, a length N complex sequence, then a preamble could be formed as shown in FIG. 8, where, $g_{i,j}$, j=0, . . . , N-1, multiplies every element in A. Normally the sets of $G_1$'s are chosen to be orthogonal to each other. This will allow for a maximum of N possible waveforms. The total number of possible preambles is then L*N.

The preferred approach is to use different codes rather than a single repeating code in generating each preamble. In that case, if L possible codes, not necessarily Gold Codes, were possible, designated by $A_0, A_1, \ldots A_{L-1}$, then possible preambles will be as shown in FIG. 8. The order of the $A_1$'s can be chosen so that identical codes are not used in the same locations for two different preambles. A similar approach could be used to form the pilot signals.

The Downlink Common Control Channel

In FIG. 10, the downlink common control channel structure for even and odd slots is shown. The even slots contain reference data and control data. The pilot symbols are used to derive a reference for demodulating the remaining control symbols. The control symbols are made of transport frame indicator (TFI) symbols, power control (PC) symbols, collision detection (CD) symbol and signaling symbols (SIC). The odd slots contain all the information that the even slots contain plus an acknowledgment (ACK) signal. Odd slots do not include collision detection fields.

The uplink CPCH is shown over the last transmitted preamble. After the last transmitted preamble, the base station has successfully detected the transmission of the last transmitted preamble and transmits back the acknowledgment signal. During the same time, the remote station is tuned to receive the ACK signal. The ACK signal transmitted corresponds to the specific preamble structure transmitted on the uplink. Once the remote station detects the ACK signal corresponding to transmitted preamble by the remote station, the remote station begins transmission of its data.

Corresponding with the preamble structure in the uplink there is a corresponding in time power control information symbol and a corresponding in time collision detection field. Upon start of data transmission the remote station uses the downlink transmitted power control information to adjust its transmitted power. The power control symbols are decoded to derive a binary decision data, which is then used to increase or decrease the transmitted power accordingly. FIG. 11 shows the structure of the uplink frame and the slot format for the data portion of the uplink transmission. Data and control information is transmitted in an in-phase and quadrature-phase multiplexed format. That is, the data portion could be transmitted on the in-phase coordinate and the control portion on the quadrature-phase coordinate. The modulation for the data and control is BPSK. The control channel contains the information for the receiver to enable the demodulation of the data. The control channel provides for upper layer system functionality. The data portion consists of one or more frames. Each frame consists of a number of slots. As an example the frame duration could be 10 milliseconds long and the slot duration 0.625 milliseconds long. In that case, there are 16 slots per frame. The beginning of the data payload contains a collision detection field used to relay information about the possibility of collision with other simultaneously transmitting remote stations. The collision detection field is read by the base station. The base station expects the presence of the collision detection field since it had provided an ACK signal at the last time slot.

The collision detection field includes a temporary identification (ID) number chosen at random by the mobile for the transmission of the current packet. The base station reads the collision detection field and reflects, or transmits back, the collision detection field on the downlink. If the collision detection field detected by the remote station matched the one just being transmitted by the same remote station, then the collision detection field is an identification that the transmission is being received correctly. The remote station then continues transmitting the remaining of the packet. In case the collision detection field has not been received correctly by the remote station, then the remote station considers the packet reception by the base station as erroneous and discontinues transmission of the remaining packet.

The function of the remaining fields are as follows. The Pilot field enables the demodulation of both the data and control bits. The transmitted power control (TPC) bits are used to control the power of a corresponding downlink channel, in case a down link channel directed to the same user is operational. If the downlink channel were not operational, then the TPC control bits can be used to relay additional pilot bits instead.

The Rate Information (RI) field is used to provide the transmitter with the ability to change its data rate without the necessity to explicitly negotiate the instantaneous data rate with the base station. The service field provides information of the particular service the data bits are to be used for. The length field specifies the time duration of the packet. The signal field can be used to provide additional control information as required.

Additional functionalities of the common packet channel are: (1) bandwidth management and (2) L2 acknowledgment mechanism.

The bandwidth management functionality is implemented via signaling information on the down link common control channel. There are three ways for incorporating this functionality. The first relies on changing the priority status of all uplink users, which currently are transmitting information using the CPCH. By this method all the users are remapping their priority status via a control signal sent at the downlink. When the priority of the CPCH users is lowered their ability to capture an uplink channel is lowered. Thus the amount of data sent on the uplink by the CPCH users is thus reduced. The other mechanism is for the base station to relay the maximum possible data rate the CPCH users are allowed to transmit. This prevents the CPCH users from transmitting at a rate which could possibly exceed the uplink system capacity and therefore take the cell down, i.e., disrupt the communication for all users currently connected to the base station. For the third method, the base station could provide a negative acknowledgment through the ACK signal. In this case, any remote station which is tuned to receive the ACK signal is prohibited from further transmission of an access-burst signal.

The L2 acknowledgment (L2 ACK) mechanism, which is different than the L1 ACK, is used by the base station to notify the remote station for the correctness of an uplink packet reception. The base station could either relay to the remote station which portions of the packet have being received correctly or which have being received incorrectly. There are many existing ways of implementing a particular protocol to relay this type of information. For example, the packet could be identified as consisting of a number of frames, with each frame consisting of a number of sub-frames. The frames are identified by a predetermined number. The sub-frames in each frame are also identified by a specific number. One way for the base to relay the information about the correctness of the packet is to identify all the frames and sub-frames that have been received correctly. Another way is to identify the frames and sub-frames that have been received in error. The way the base station could identify the correctness of a frame or sub-frame is by checking its cyclic residue code (CRC) field. Other more robust mechanisms for acknowledgment may be used. For example, a negative acknowledgment may be part of the common packet channel. The base station could send a negative acknowledgment (ACK), as part of the L1 ACK, in order to force the remote station from transmitting the message part.

CD Operation

There are many remote stations that might try to access the base station at the same time. There is a number of different preamble signals which a remote station can use for reaching the base station. Each remote station chooses at random one of the preamble signals to use for accessing the base station. The base station transmits a broadcast common synchronization channel. This broadcast common synchronization channel includes a frame timing signal. The remote stations extract the frame timing transmitted by the base station by receiving the broadcast common synchronization channel. The frame timing is used by the remote stations to derive a timing schedule by dividing the frame duration in a number of access slots. The remote stations are allowed to transmit their preambles only at the beginning of each access slot. The actual transmit times for different remote stations could be slightly different due to their different propagation delays. This defines an access protocol commonly known as the slotted ALOHA access protocol. Each remote station repeatedly transmits its preamble signal until the base station detects the preamble, acknowledges that the preamble is received, and the acknowledgment is correctly received by the remote station. There could be more than one remote station transmitting the same preamble signal in the same access slot. The base station cannot recognize if two or more remote stations were transmitting the same preamble in the same access slot. When the base station detects the transmission of a preamble signal, it transmits back an acknowledgment message. There is one acknowledgment message corresponding to each possible preamble signal. Therefore, the are as many acknowledgment messages as there are preamble signals. Every transmitting remote station which receives an acknowledgment message corresponding to its transmitting preamble signal, will start transmitting its message. For each preamble signal, there is a corresponding spreading code used by the base station to transmit the message. The message transmission always starts at the beginning of an access slot. Since there could be a number of remote stations using the same preamble signal in the same access slot, they start transmitting their message at the same time using the same spreading code. In that case, the transmissions of the remote stations likely interferes with each other and thus is not received correctly.

Each remote station includes a collision detection (CD) field in the beginning of the transmitted message. The CD field is chosen at random by each remote station and independently from each other Remote Station. There is a predefined limited number of CD fields. Two remote stations transmitting their message at the same time most likely chose a different CD field. When the base station receives the CD field, the base station reflects back, transmits back, the CD field to the remote station. The remote station reads the reflected CD field by the base station. If the reflected CD field matched the the CD field the remote station transmitted, the remote station assumes that the remote station is being received correctly by the base station and continue transmitting the rest of the message, or data. If the reflected CD field from the base station did not match the one transmitted by the remote station, then the remove station assumes that there has been a collision and stops transmitting the remaining message or data.

It will be apparent to those skilled in the art that various modifications can be made to the common packet channel of the instant invention without departing from the scope or spirit of the invention, and it is intended that the present invention cover modifications and variations of the common packet channel provided they come within the scope of the appended claims and their equivalents.

We claim:

1. In a code-division-multiple-access (CDMA) system employing spread-spectrum modulation comprising a base station (BS) comprising a BS-spread-spectrum transmitter and a BS-spread-spectrum receiver, and a plurality of remote stations, each remote station (RS) comprising an RS-spread-spectrum transmitter and an RS-spread-spectrum receiver, a method comprising the steps of:

transmitting from said BS-spread-spectrum transmitter, a broadcast common-synchronization channel having a common chip-sequence signal, the broadcast common-synchronization channel comprising a frame-timing signal;

receiving at an RS-spread-spectrum receiver of one remote station the broadcast common-synchronization channel, and determining frame timing at said RS-spread-spectrum receiver from the frame-timing signal;

transmitting from an RS-spread-spectrum transmitter of the one remote station an access-burst signal, the access-burst signal comprising a plurality of segments having a plurality of respective power levels;

receiving at said BS spread-spectrum receiver at least one segment of the access-burst signal at a detected-power level;

responsive to receipt of the at least one segment transmitting an acknowledgment signal from said BS-spread-spectrum transmitter;

receiving the acknowledgment signal at said RS-spread-spectrum receiver;

transmitting from said RS-spread-spectrum transmitter, responsive to the receipt of the acknowledgment signal, a spread-spectrum signal comprising data; and transmitting from said BS-spread-spectrum transmitter, any of data and power control information, to said RS-spread-spectrum receiver.

2. A method as set forth in claim 1, wherein the step of transmitting the access-burst signal comprises transmitting the plurality of segments at sequentially increasing power levels.

3. A method as set forth in claim 1, further comprising the steps of:

transmitting, from said RS-spread-spectrum transmitter, responsive to receipt of the acknowledgment signal, a selected RS-collision-detection (CD) preamble from a plurality of RS-CD preambles;

detecting, at said BS-spread-spectrum receiver, the selected RS-CD preamble;

transmitting, from said BS-spread-spectrum transmitter in response to detecting the selected RS-CD preamble, a BS-CD preamble;

detecting, at said RS-spread-spectrum receiver, the BS-CD preamble; and transmitting, from said RS-spread-spectrum transmitter, data to said base station.

4. A method as set forth in claim 3, wherein the BS-CD preamble corresponds to the selected RS-CD preamble.

5. An improvement to a code-division-multiple-access (CDMA) system employing spread-spectrum modulation, the CDMA system comprising a base station (BS) and a plurality of remote stations (RS), the improvement comprising:

a BS spread-spectrum transmitter located at said base station, for transmitting a broadcast common-synchronization channel having a common chip-sequence signal, the broadcast common-synchronization channel comprising a frame-timing signal;

an RS-sprcad-spectrum receiver, located at one of the remote stations, for receiving the broadcast common-synchronization channel, and determining frame timing from the frame-timing signal;

an RS-spread-spectrum transmitter, located the one first remote station, for transmitting an access-burst signal, the access-burst signal comprising a plurality of segments having a plurality of respective power levels;

a BS spread-spectrum receiver at said base station for receiving at least one segment of the access-burst signal at a detected-power level;

said BS-spread-spectrum transmitter for transmitting an acknowledgment signal responsive to receiving the at least one segment;

said RS-spread-spectrum receiver for receiving the acknowledgment signal;

said RS-spread-spectrum transmitter for transmitting a spread-spectrum signal comprising data responsive to the receipt of the acknowledgment signal; and said RS-spread-spectrum transmitter for transmitting any of data and power-control information, to said RS-sprcad-spectrum receiver.

6. The improvement as set forth in claim 3, wherein said RS-spread-spectrum transmitter sends the segments of the access-burst signal at sequentially increasing power levels.

7. The improvement as set forth in claim 5, wherein:

said RS-spread-spectrum transmitter transmits a selected RS-collision-detection (CD) preamble from a plurality of RS-CD preambles in response to receipt of the acknowledgment signal;

said BS-spread-spectrum receiver detects the selected RS-CD preamble;

said BS-spread-spectrum transmitter transmits a BS-CD preamble in response to detecting the selected RS-CD preamble;

said RS-spread-spectrum receiver detects the BS-CD preamble; and said RS-spread-spectrum transmitter transmits data to said base station.

8. The improvement as set forth in claim 7, wherein the BS-CD preamble transmitted by the BS-spread-spectrum transmitter corresponds to the selected RS-CD preamble.

9. In a code-division-multiple-access (CDMA) system employing spread-spectrum modulation, the CDMA system comprising a first base station (BS) comprising a first BS-spread-spectrum transmitter and a first BS-spread-spectrum receiver, a second base station comprising a second BS-spread-spectrum transmitter and a second BS-spread-spectrum receiver, and a plurality of remote stations, each remote station (RS) comprising an RS-spread-spectrum transmitter and an RS-spread-spectrum receiver, a method comprising the steps of:

transmitting from said first BS-spread-spectrum transmitter a first broadcast common-synchronization channel having a first common chip-sequence signal, the first broadcast common-synchronization channel comprising a first frame-timing signal;

transmitting from said second BS-spread-spectrum transmitter, a second broadcast common-synchronization channel having a second common chip-sequence signal, the second broadcast common-synchronization channel comprising a second frame-timing signal;

at one remote station, receiving in the RS-spread-spectrum receiver the first broadcast common-synchronization channel, and determining a first frame timing from the first frame-timing signal;

receiving at the RS-spread-spectrum receiver of the one remote station the second broadcast common-synchronization channel, and determining a second frame timing from the second frame-timing signal;

responsive to the received common-synchronization channels, determining at said one remote station to transmit to said first base station;

from the RS-spread-spectrum transmitter of the one remote station, transmitting a first access-burst signal, the first access-burst signal comprising a first plurality of segments at a first plurality of respective power levels;

receiving at said first BS spread-spectrum receiver at least one segment of the first access-burst signal at a first detected-power level;

transmitting from said first BS-spread-spectrum transmitter a first acknowledgment signals responsive to the receipt of the at least one segment;

receiving the first acknowledgment signal at the RS-spread-spectrum receiver of the one remote station; and responsive to the receipt of the first acknowledgment signal, transmitting a first spread-spectrum signal comprising data from the RS-spread-spectrum transmitter of the one remote station.

10. The method as set forth in claim 9, further comprising the step of transmitting from said first BS-spread-spectrum transmitter, any of data and power-control information, to the RS-spread-spectrum receiver of the one remote station.

11. The method as set forth in claim 9, wherein the step of transmitting the first access-burst signal comprises transmitting the segments at sequentially increasing power levels.

12. The method as set forth in claim 11, further comprising the step of transmitting from said first BS-spread-spectrum transmitter, any of data and power-control information, to the RS-spread-spectrum receiver of the one remote station.

13. The method as set forth in claim 9, further comprising the steps of:

determining, based on any of power levels and probabilities of error, at the one remote station, from the first and the second broadcast common-synchronization channels, to further transmit to said second base station;

transmitting from the RS-spread-spectrum transmitter of the one remote station to said second base station, a second access-burst signal comprising a second plurality of segments at a second plurality of respective power levels;

receiving at said second BS-spread-spectrum receiver at least one segment of the second access-burst signal at a second detected-power level;

transmitting a second acknowledgment signal from said second BS-spread-spectrum transmitter, responsive to the receipt of the at least one segment of the second access-burst signal;

receiving the second acknowledgment signal at the RS-spread-spectrum receiver of the one remote station; and transmitting a second spread-spectrum signal comprising data from said RS-spread-spectrum transmitter of the one remote station, responsive to the receipt of the second acknowledgment signal, to said second BS-spread-spectrum receiver.

14. The method as set forth in claim 13, further comprising the step of transmitting from said second BS-spread-spectrum transmitter, any of data and power-control information, to the RS-spread-spectrum receiver of the one remote station.

15. The method as set forth in claim 13, wherein the step of transmitting the second access-burst signal comprises transmitting the second plurality of segments at sequentially increasing power levels.

16. The method as set forth in claim 15, further comprising the step of transmitting from said second BS-spread-spectrum transmitter, any of data and power-control information, to the RS-spread-spectrum receiver of the one remote station.

17. A method as set forth in claim 9, further comprising the steps of:

transmitting, from the RS-spread-spectrum transmitter of the one remote station an RS-collision-detection (CD) preamble selected from a plurality of RS-CD preambles responsive to receipt of the first acknowledgment signal;

detecting, at said first BS-spread-spectrum receiver, the selected RS-CD preamble;

transmitting a BS-CD preamble from said first BS-spread-spectrum transmitter, in response to detecting the selected RS-CD preamble;

detecting, at the RS-spread-spectrum receiver of the one remote station, the BS-CD preamble; and transmitting data to said first base station from the RS-spread-spectrum transmitter of the one remote station.

18. The improvement as set forth in claim 17, wherein the BS-CD preamble corresponds to the selected RS-CD preamble.

19. An improvement to a code-division-multiple-access (CDMA) system employing spread-spectrum modulation, the CDMA system comprising a first base station (BS), a second base station, and a plurality of remote stations (RS), the improvement comprising:

a first BS spread-spectrum transmitter located at said first base station, for transmitting a first broadcast common-synchronization channel having a first common chip-sequence signal common to the plurality of remote stations, the first broadcast common-synchronization channel comprising a first frame-timing signal;

a second BS spread-spectrum transmitter located at said second base station, for transmitting a second broadcast common-synchronization channel having a second common chip-sequence signal common to the plurality of remote stations, the second broadcast common-synchronization channel comprising a second frame-timing signal;

an RS-spread-spectrum receiver, located at one of the plurality of remote stations, for receiving the first and second broadcast common-synchronization channels, and determining a first frame timing from the first frame-timing signal and determining a second frame timing from the second frame-timing signal;

means located at said one remote station, for determining from the first broadcast common-synchronization channel and from the second broadcast common-synchronization channel, to transmit to said first base station based on any of power levels and probabilities of error;

an RS-spread-spectrum transmitter, located at said one remote station, for transmitting a first access-burst signal comprising a first plurality of segments having a first plurality of respective power levels;

a first BS spread-spectrum receiver located at said first base station for receiving at least one segment of the first access-burst signal at a detected-power level;

said first BS-spread-spectrum transmitter for transmitting a first acknowledgment signal, responsive to the receipt of at least one segment of the first access-burst signal;

said RS-spread-spectrum receiver for receiving the first acknowledgment signal; and said first RS-spread-spectrum transmitter for transmitting a first spread-spectrum signal comprising data responsive to the receipt of the first acknowledgment signal.

20. The improvement as set forth in claim 19, wherein said first BS-spread-spectrum transmitter also is for transmitting any of data and power-control information, to said RS-spread-spectrum receiver.

21. The improvement as set forth in claim 19, wherein said RS-spread-spectrum transmitter sends the segments of the first access-burst signal at sequentially increasing power levels.

22. The improvement as set forth in claim 21, wherein said first BS-spread-spectrum transmitter is for transmitting any of data and power-control information, to said RS-spread-spectrum receiver.

23. The improvement as set forth in claim 19, wherein:

said means further determines to transmit to said second base station based on any of power levels and probabilities of errors determined from the received broadcast common-synchronization channels;

said RS-spread-spectrum transmitter for transmitting to said second base station, a second access-burst signal comprising a second plurality of segments at a second plurality of respective power levels;

said second BS spread-spectrum receiver for receiving at least one segment of the second access-burst signal at a second detected-power level;

said second BS-spread-spectrum transmitter for transmitting to said RS-spread-spectrum receiver a second acknowledgment signal, responsive to the receipt of the at least one segment of the second access-burst signal;

said RS-spread-spectrum receiver for receiving the second acknowledgment signal; and said RS-spread-spectrum transmitter for transmitting to said second BS-spread-spectrum receiver, a second spread-spectrum signal having data, responsive to the receipt of the second acknowledgment signal.

24. The improvement as set forth in claim 23, wherein said second BS-spread-spectrum transmitter transmits any of data and power-control information, to said RS-spread-spectrum receiver.

25. The improvement as set forth in claim 23, wherein said RS-spread-spectrum transmitter transmits the second access-burst signal with the second plurality of segments having sequentially increasing power levels.

26. The improvement as set forth in claim 25, wherein said second BS-spread-spectrum transmitter transmits any of data and power-control information, to said RS-spread-spectrum receiver.

27. The improvement as set forth in claim 19, wherein:

said RS-spread-spectrum transmitter transmits an RS-collision-detection (CD) preamble selected from a plurality of RS-CD preambles, in response to receipt of the first acknowledgement signal at the one remote station;

if said first BS-spread-spectrum receiver detects the selected RS-CD preamble, said first BS-spread-spectrum transmitter transmits a BS-CD preamble; and if said RS-spread-spectrum receiver detects the BS-CD preamble, said RS-spread-spectrum transmitter transmits data to said first base station.

28. The improvement as set forth in claim 27, wherein the BS-CD preamble corresponds to the selected RS-CD preamble.

29. A method of transferring data for one a plurality of wireless remote station (RS) handsets through a base station (BS) of a wireless telecommunication network, the base station comprising a BS-spread-spectrum transmitter and a BS-spread-spectrum receiver, the method comprising the steps of:

transmitting a frame-timing signal from said BS-spread-spectrum transmitter over a broadcast common-synchronization channel having a common chip-sequence signal;

receiving the broadcast common-synchronization channel comprising a frame timing signal at an RS-spread-spectrum receiver of the one RS handset;

determining frame timing at an RS-spread-spectrum receiver of the one RS handset from the received frame-timing signal;

transmitting an access-burst signal from an RS-spread-spectrum transmitter of the one RS handset, the access-burst signal comprising a plurality of segments;

receiving at least one segment of the access-burst signal at said BS spread-spectrum receiver;

transmitting an acknowledgment from said BS-spread-spectrum transmitter, in response to the receipt of the at least one segment of the access-burst signal;

receiving the acknowledgment at said RS-spread-spectrum receiver;

transmitting a spread-spectrum signal comprising data from said RS-spread-spectrum transmitter, in response to the receipt of the acknowledgment;

receiving the spread-spectrum signal comprising data at said BS-spread-spectrum receiver; and forwarding the data from said base station to another network element.

30. The method as set forth in claim 29, wherein:

the step of transmitting the access-burst signal comprises transmitting the segments at a plurality of respective power levels; and the step of receiving at least one segment comprises receiving at least one segment at a detected-power level.

31. The method as set forth in claim 30, wherein the step of transmitting the access-burst signal comprises transmitting the segments at sequentially increasing power levels.

32. The method as set forth in claim 29, further comprising:

transmitting a selected one of a plurality of collision-detection (CD) codes by said RS-spread-spectrum transmitter, in response to receipt of the acknowledgment;

if the BS-spread-spectrum receiver detects the selected CD code from the RS-spread-spectrum transmitter, transmitting a BS-CD code from said BS-spread-spectrum transmitter; and if the RS-spread-spectrum receiver detects the BS-CD code, transmitting data to said base station, from said RS-spread-spectrum transmitter.

33. A method of transferring data by one of a plurality of wireless handsets, through a wireless telecommunication infrastructure comprising a first base station (BS) and a second base station, the one wireless handset having a remote-station (RS)-spread-spectrum transmitter and an RS-spread-spectrum receiver, the first base station comprising a first BS-spread-spectrum transmitter and a first BS-spread-spectrum receiver, the second base station comprising a second BS-spread-spectrum transmitter and a second BS-spread-spectrum receiver, the method comprising the steps of:

transmitting a first frame-timing signal from the first BS-spread-spectrum transmitter over a first broadcast common-synchronization channel having a first common chip-sequence signal;

transmitting a second frame-timing signal from the second BS-spread-spectrum transmitter over a second broadcast common-synchronization channel having a second common chip-sequence signal;

at the RS-spread-spectrum receiver, receiving the first and second broadcast common-synchronization channels;

at the one wireless handset, based on any of power levels and probabilities of error determined from the first broadcast common-synchronization channel and from the second broadcast common-synchronization channel, determining to transmit to said first base station;

transmitting from the RS-spread-spectrum transmitter a first access-burst signal, in a predetermined relationship to the first frame timing signal, the first access-burst signal comprising a plurality of segments;

receiving at least one segment of the first access-burst signal at said first BS spread-spectrum receiver;

transmitting a first acknowledgment signal from said first BS-spread-spectrum transmitter, in response to receipt of the at least one segment;

receiving at said RS-spread-spectrum receiver the first acknowledgment signal; and in response to receipt of the first acknowledgment signal, transmitting a first spread-spectrum signal comprising data, from said first RS-spread-spectrum transmitter to said first BS-spread-spectrum receiver.

34. The method as set forth in claim 33, further comprising transmitting data or power control information from said first BS-spread-spectrum transmitter to said RS-spread-spectrum receiver.

35. The method as set forth in claim 33, wherein:

the step of transmitting the first access-burst signal comprises transmitting the first plurality of segments at a plurality of respective power levels; and the step of receiving at least one segment of the first access-burst signal comprises receiving at least one segment of the first access-burst signal at a detected-power level.

36. The method as set forth in claim 35, wherein the step of transmitting the first plurality of segments comprises transmitting the first plurality of segments at sequentially increasing power levels.

37. The method as set forth in claim 35, further comprising transmitting data or powercontrol information from said first BS-spread-spectrum transmitter to said RS-spread-spectrum receiver.

38. The method as set forth in claim 33, further comprising:

at the one wireless handset, determining from the broadcast common-synchronization channels to subsequently transmit to said second base station, based on any of power levels and probabilities of error;

transmitting a second access-burst signal from the RS-spread-spectrum transmitter, the second access-burst signal comprising a plurality of segments;

receiving at least one segment of the second access-burst signal at said second BS spread-spectrum receiver;

transmitting a second acknowledgment signal from said second BS-spread-spectrum transmitter, in response to the receipt of at least one segment of the second access-burst signal;

receiving the second acknowledgment signal at said RS-spread-spectrum receiver; and in response to receipt of the second acknowledgment signal, transmitting a second spread-spectrum signal comprising data, from the RS-spread-spectrum transmitter to the second BS-spread-spectrum receiver.

39. The method as set forth in claim 38, further comprising transmitting data or power control information from said second BS-spread-spectrum transmitter to said RS-spread-spectrum receiver.

40. The method as set forth in claim 38, wherein:

the step of transmitting the second access-burst signal comprises transmitting the plurality of segments of the second access-burst signal at a plurality of respective power levels; and the step of receiving at least one segment of the second access-burst signal comprises receiving at least one segment of the second access-burst signal at a detected-power level.

41. The method as set forth in claim 40, wherein the step of transmitting segments of the second access-burst signal comprises transmitting the segments of the second access-burst signal at sequentially increasing power levels.

42. The method as set forth in claim 40, further comprising transmitting data or power-control information from said first BS-spread-spectrum transmitter to said RS-spread-spectrum receiver.

43. The method as set forth in claim 33, further comprising the steps of:
   transmitting an RS-collision-detection (CD) preamble, selected from a plurality of RS-CD preambles, from said first RS-spread-spectrum transmitter in response to receipt of the first acknowledgment signal;
   at said first BS-spread-spectrum receiver, detecting the RS-CD preamble;
   in response to detection of the RS-CD preamble, transmitting a BS-CD preamble, from said first BS-spread-spectrum transmitter;
   detecting the BS-CD preamble at said RS-spread-spectrum receiver; and
   in response to detection of the BS-CD preamble, transmitting data from said RS-spread-spectrum transmitter to said base station.

44. The method as set forth in claim 43, wherein the BS-CD preamble corresponds to the selected RS-CD preamble.

45. A method of providing a common packet channel communication service, in a code-division-multiple-access (CDMA) wireless network, the method comprising:
   broadcasting a frame-timing signal from a CDMA base station of the network, over a common synchronization channel modulated with a common chip-sequence signal;
   deriving a slotted-aloha timing reference from the frame-timing signal receiving over the common packet channel from each of at least one or more of a plurality of remote CDMA stations at least part of one or more access bursts, each comprising a sequence of coded preamble signals transmitted at sequentially increasing discrete power levels, each coded preamble signal being sent in accord with the slotted-aloha timing reference;
   selectively authorizing each of said at least one or more remote CDMA stations to access the common packet channel for packet transmissions to the CDMA base station, according to the slotted-aloha timing reference, in response to detection of one or more preambles in one or more received parts of access bursts; and
   receiving CDMA packet data transmitted from the one or more selectively authorized remote CDMA stations over the common packet channel at the CDMA base station in accordance with the slotted-aloha timing reference.

46. A method as in claim 45, further comprising transmitting power control signals from the CDMA base station for the one or more of the remote CDMA stations, in response to the one or more parts of access bursts received over the common packet channel.

47. A method as in claim 45, further comprising outputting the received packet data from the CDMA base station to another network element.

48. A method as in claim 45, wherein the step of selectively authorizing comprises: receiving preamble codes from respective remote CDMA stations; and in response, transmitting back acknowledgement signals, each acknowledgment signal comprising a code corresponding to a respective one of the preamble codes.

49. A method as in claim 48, wherein the step of receiving preamble codes comprises:
   (a) receiving a first one of a plurality of available preamble codes over the common packet channel in an interval defined in relation to the frame timing signal; and
   (b) receiving a second one of the available preamble codes over the common packet channel in an interval defined in relation to the frame timing signal.

50. A method as in claim 49, wherein the step of transmitting back acknowledgement signals comprises:
   (i) transmitting back a first acknowledgement signal comprising a first code corresponding to the first preamble code, following receipt of the first preamble code; and
   (ii) transmitting back a second acknowledgement signal comprising a second code corresponding to the second preamble code, following receipt of the second preamble code.

51. A method as in claim 45, wherein:
   the step of receiving CDMA packet data comprises receiving over the common packet channel a randomly selected collision detection code before each of a plurality of data messages from each selectively authorized remote CDMA station, and
   in response to receipt of each of the collision detection codes, the method further comprises transmitting back a corresponding collision detection code.

52. A code-division-multiple-access (CDMA) wireless base station, comprising:
   a CDMA transmitter;
   a CDMA receiver; and
   a controller coupled to the CDMA receiver for responding to signals received via the CDMA receiver and coupled for controlling the CDMA transmitter, such that in operation the CDMA base station is for performing the following steps:
   receiving over a common packet channel from a remote station an access burst comprising a sequence of coded preamble signals at sequentially increasing discrete power levels;
   detecting a first one of the coded preamble signals of the sequence that is received at an adequate power level;
   upon detection of the first coded preamble signal at the adequate power level, transmitting an acknowledgement signal and a power control signal; and
   receiving data over the common packet channel from the remote station.

53. A CDMA base station, as in claim 52, wherein the acknowledgement signal comprises a coded signal corresponding to the first coded preamble signal detected at the adequate power level.

54. A CDMA base station, as in claim 52, wherein the base station also transmits a frame-timing signal over a common synchronization channel modulated with a common chip-sequence signal.

55. A CDMA base station, as in claim 54, wherein the base station receives the access burst beginning in one of a plurality of access slots defined in relation to the frame-timing signal.

56. A CDMA base station, as in claim 52, wherein:
   the reception of data over the common packet channel from the remote station comprises receiving a coded collision detection signal and receiving message data over the common packet channel from the remote station; and
   upon receipt of the coded collision detection signal, the controller causes the CDMA base station to transmit back a corresponding coded collision detection signal.

57. A code-division-multiple-access (CDMA) wireless communication system, comprising:
   a network of CDMA base stations, each CDMA base station comprising: a CDMA transmitter; a CDMA receiver; and a controller coupled to the CDMA receiver and the CDMA transmitter to cause each respective base station to:

broadcast a frame-timing signal over a common synchronization channel modulated with a common chip-sequence signal;

receive over a common packet channel from each of a plurality of remote CDMA stations at least part of an access burst comprising a sequence of coded preamble signals transmitted at sequentially increasing discrete power levels and in a predetermined slotted-aloha relationship to the frame-timing signal;

selectively authorize the remote CDMA stations to access the common packet channel for packet transmissions to the respective CDMA base station, on a slotted-aloha basis in response to detection of preambles in the received parts of access bursts from the remote CDMA stations transmit power control signals for the remote CDMA stations, in response to access bursts from the CDMA remote stations at least partially received by the respective CDMA base station;

receive CDMA packet data transmitted from the selectively authorized remote CDMA stations over the common packet channel; and forward at least some of the received packet data through the network.

58. A code-division-multiple-access (CDMA) wireless communication system, comprising:

a network of CDMA base stations, each respective base station being assigned a respective set of possible coded preamble signals for use in CDMA communication with the respective CDMA base station, each CDMA base station comprising:

a CDMA transmitter;

a CDMA receiver; and a controller coupled to the CDMA receiver and the CDMA transmitter to cause each respective base station to perform the following steps:

receiving over a common packet channel from a remote stations at sequentially increasing discrete power levels one of the coded preamble signals assigned to the respective base station selected by the remote station;

detecting a first one of the coded preamble signals of the sequence that is received at an adequate power level;

sending a coded acknowledgement signal corresponding to the detected coded preamble signal;

receiving data over the common packet channel from the remote station; and forwarding at least some of the received data through the network.

* * * * *

UNITED STATES PATENT AND TRADEMARK OFFICE
CERTIFICATE OF CORRECTION

PATENT NO. : 6,169,759 B1
DATED : January 2, 2001
INVENTOR(S) : Emmanuel Kanterakis et al.

It is certified that error appears in the above-identified patent and that said Letters Patent is hereby corrected as shown below:

Column 1,
Below the titles, in the first line of the first paragraph, after "relates", insert -- to --;

Column 2,
Line 21, after "channel", insert -- ; --;

Column 5,
Line 10, change "MS" to -- RS --;

Column 11,
Line 17, delete "the" (first occurrence);
Line 19, change "continue" to -- continues --;
Line 22, change "remove" to -- remote --.

Column 12, claim 5,
Line 31, change "RS" to -- BS --;

Column 16, claim 29,
Line 1, after "one", insert -- of --.

Signed and Sealed this

Eleventh Day of December, 2001

Attest:

NICHOLAS P. GODICI
*Attesting Officer*  *Acting Director of the United States Patent and Trademark Office*